United States Patent

[11] 3,602,340

| [72] | Inventors | Tadeusz Budzich<br>Moreland Hills;<br>Frederick S. Browne, Euclid, both of, Ohio |
|---|---|---|
| [21] | Appl. No. | 814,929 |
| [22] | Filed | Apr. 10, 1969 |
| [45] | Patented | Aug. 31, 1971 |
| [73] | Assignee | The Weatherhead Company<br>Cleveland, Ohio |

[54] VALVE STEM FRICTION DEVICE
4 Claims, 5 Drawing Figs.

[52] U.S. Cl. ............................ 188/67,
74/531, 251/214, 251/297
[51] Int. Cl. ............................ B65h 59/10
[50] Field of Search ............................ 251/214,
297; 188/67, 196 P; 74/531

[56] References Cited
UNITED STATES PATENTS

| 940,163 | 11/1909 | Kiel | 251/214 X |
| 2,390,168 | 12/1945 | Piot | 188/67 UX |
| 2,567,527 | 9/1951 | Parks | 251/214 X |
| 2,878,901 | 3/1959 | Runner | 188/67 X |
| 3,009,747 | 11/1961 | Pitzer | 188/67 UX |
| 3,129,400 | 4/1964 | Hartman | 74/531 X |

*Primary Examiner*—George E. A. Halvosa
*Attorney*—McNenny, Farrington, Pearne & Gordon ABSTRACT: A braking and locking structure for frictionally supporting a shaft, such as a valve stem, for axial and rotational movement in a housing comprising a cylindrical surface on the periphery of the shaft, a friction sleeve in frictional engagement with the cylindrical surface and axially located between abutment washers in the housing. The friction sleeve is plastically deformed in a radially outward direction for engagement with the cylindrical surface with a frictional force independent of the actual amount of radial deformation from its original nominal size and, additionally, the sleeve is provided with an axially extending lip plastically deformed to allow the sleeve to assume a length equal to the spacing between the abutment washers determined by the dimensions of the various components to eliminate axial lost motion of the friction sleeve.

INVENTORS
TADEUSZ BUDZICH,
& FREDERICK S. BROWNE
BY
McNENNY, FARRINGTON, PEARNE & GORDON

ATTORNEYS

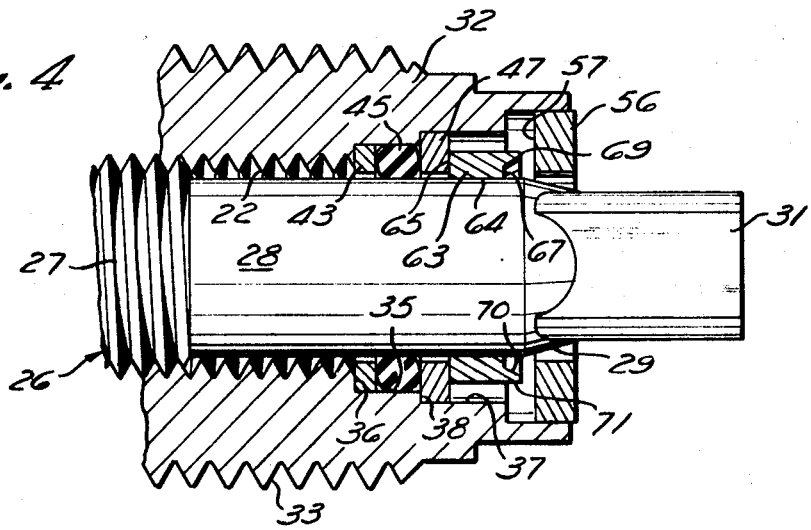
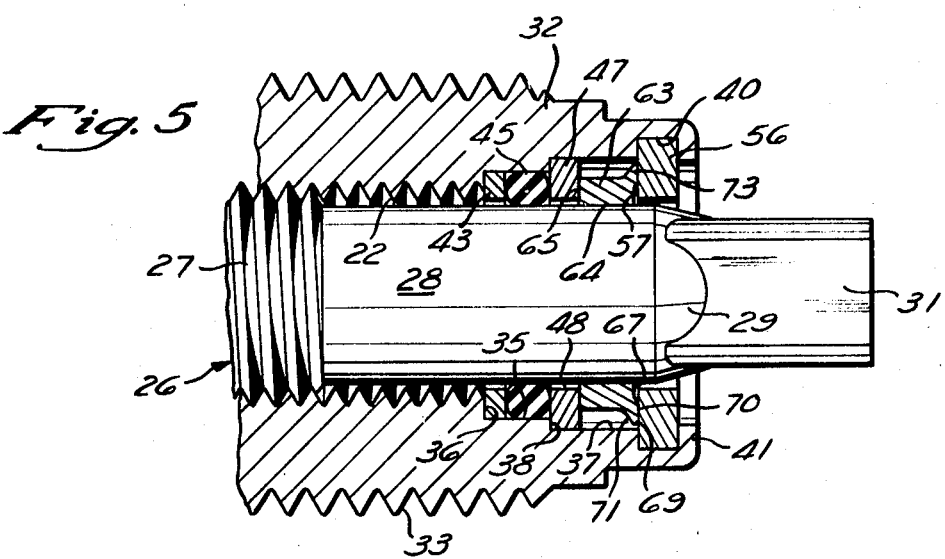

VALVE STEM FRICTION DEVICE

This invention relates generally to a friction braking or locking arrangement adapted to restrain axial and/or rotary movement between a shaft and a structure supporting the shaft for guided movement.

There are many applications and arrangements in which a shaft member is mounted in a supporting member and it is desired to provide a form of friction braking or locking tending to restrain relative movement between the shaft and the supporting member. Although various positive locking arrangements may be provided, there are many advantages to providing a purely frictional restraining or locking arrangement in which the friction restraining or locking force is limited in extent to allow relative motion between the shaft and the supporting member under certain conditions while positively restraining such movement under other conditions where no relative movement is desired.

A particular application of such an arrangement may be found in certain valves in which it is desired to frictionally restrain or lock movement of a valve stem with respect to the supporting valve body in such a way that the stem will be frictionally retained in place against undesirable external forces tending to produce relative movement, such as vibration and impact loading, while it is desired that upon application of the proper tool to the valve stem, movement of the valve stem in the desired direction can be obtained with a minimum of applied force.

The application of such devices to a valve stem provides a particular problem in that since the movement of the valve stem involves both a rotational and axial movement, the movement, both desired and undesired, of the valve stem with respect to the valve body, must be taken in account to provide the desired frictional restraining or locking force. In addition, since a usual arrangement involves a helical motion of the valve stem provided by suitable guiding means such as screw threads or the like, account must be taken of both axial and rotary forces in selecting an arrangement which provides sufficient frictional restraining or locking force for the valve stem without unduly preventing desired movement of the valve stem for purposes of valve actuation.

In some applications, the use of a packing gland arrangement in which the packing material can be tightened by a compression nut is often sufficient to provide a certain amount of frictional restraint against movement of the valve stem, but this construction requires against movement of the valve stem, but this construction requires that the packing material be selected primarily with respect to its sealing abilities rather than its frictional abilities. In addition, most sealing materials used in packing for valve stems tend to be limited in the range of temperatures in which they provide the desired frictional force, and furthermore, they tend, because of their properties for sealing purposes, to wear quickly and therefore require continual attention and adjustment of the packing nut in order to provide a desired frictional restraint on movement of the valve stem.

It is therefore a principal object of this invention to provide a novel and improved arrangement of friction braking or locking arrangement for a shaft which tends to retain constant friction with minimal wear where the shaft is subjected to both axial and rotary motion.

It is another object of this invention to provide a friction braking or locking arrangement as set forth in the preceding object in which the friction braking torque is relatively constant as to both axial and rotary frictional forces.

It is a further object of this invention to provide a friction braking arrangement as set forth in the preceding objects which allows the amount of friction braking to be preselected on assembly yet be substantially independent of manufacturing tolerances.

It is a still further object of this invention to provide a friction braking arrangement as set forth in the preceding objects in which there is no lost motion and the friction braking effect is substantially the same regardless of the amount of movement of the shaft.

Briefly, the foregoing and other and additional objects and advantages of this invention are provided in a preferred embodiment of the invention which, as applied to a valve stem moving with both axial and rotary motion with respect to a valve body, includes a circumferential ring or sleeve on the valve stem which makes frictional engagement with the valve stem and is positioned with respect to the valve body by means of stop surfaces engaging the axial ends of the sleeve. Thus, when the valve is moved in a helical motion as a result of the threaded engagement between the stem and body, the restraining force increases the frictional engagement of the threads to provide one restraining force and an additional force is provided by the frictional engagement between the sleeve and the abutting stop surface in the direction in which the stem is moving. Still further frictional force is provided by the axial sliding movement of the sleeve as restrained by the stop surface under axial helical movement of the valve stem. By utilizing parts assembled together in a fixed relationship with respect to each other, such forces tend to be constant regardless of the movement. By swaging the ring on to the sleeve in such a manner that the elastic limit of the material of the sleeve is exceeded, the frictional engagement between the sleeve and the valve stem will be substantially independent of the tolerances of these parts and by selecting the dimensions such to insure that the elastic limit of the ring material is exceeded, the frictional force between the ring and the sleeve will be substantially constant regardless of tolerance variations between these parts in their original dimensions. By forming the ring in such a manner that assembly of the ring between the stop surfaces results in an axial deformation and compression of the ring material beyond its axial limits, axial play between the ring and the valve body is substantially eliminated so that there is no lost motion in the application of the frictional force so that the frictional forces will retain the valve in any selected position with substantially the same amount of restraint.

Further objects and advantages of this invention will readily become apparent upon a more complete understanding of the preferred embodiments of the invention as set forth in the following detailed description and in the drawings in which:

FIG. 4 is an enlarged fragmentary cross-sectional view similar to that of FIG. 2 and showing still another embodiment of this invention prior to the completion of assembly; and FIG. 5 is an enlarged fragmentary cross-sectional view similar to FIG. 4 showing the structure after assembly.

Figure 1:
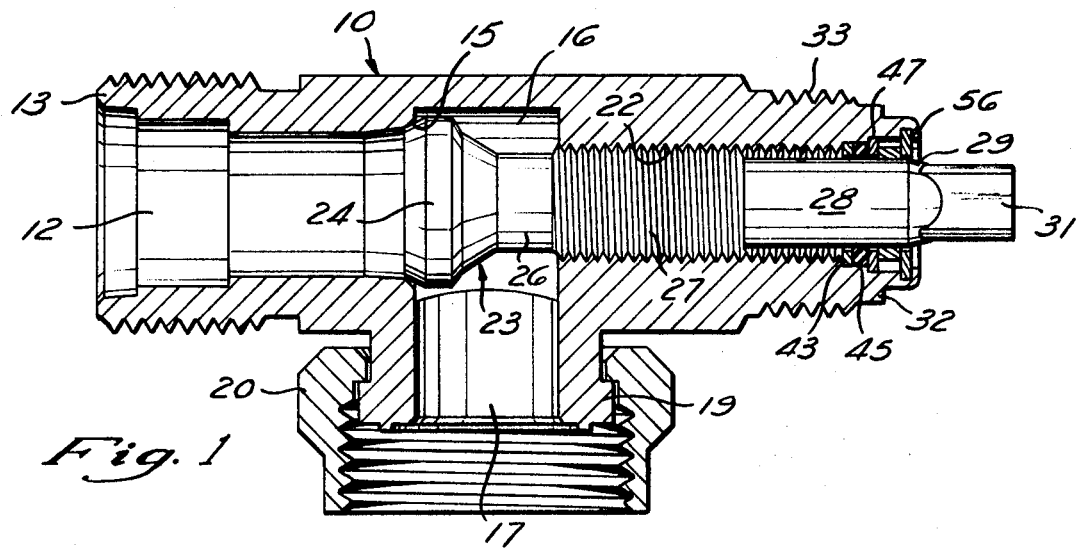
FIG. 1 is a longitudinal cross-sectional view of a valve incorporating the preferred embodiment of this invention.

Referring to the figures in greater detail, FIG. 1 shows a valve of a conventional type particularly adapted for use in refrigeration and air conditioning systems and including a valve body 10 which may be either machined from a unitary piece or assembled by brazing or welding from a plurality of individual pieces. However, since the structure of the housing apart from the details hereinafter set forth forms no part of this invention, description of the valve is shown only for environmental purposes apart from the invention.

The valve has an inlet passage 12 extending axially into the valve body from one end 13 which is arranged to receive a suitable fitting assembly. The passage 12 within the valve body 10 terminates in a valve seat 15 adjacent an internal chamber 16 which is connected to an outlet passage 17 provided at its end 19 with a suitable fitting construction and may be provided with a nut 20 for attachment to the remainder of the system.

The valve body 10 is provided with a threaded passage 22 in axial alignment with the inlet passage 12 to receive a valve member 23 having a head portion 24 adapted to make sealing engagement with the valve seat 15 and including a stem 26. Stem 26 includes a threaded portion 27 adapted to make threaded engagement with the passage 22 so that rotary motion applied to the valve stem results in axial movement of the valve head 24 toward and away from the valve seat 15. Axially outward of the threaded portion 27, valve stem 26 is provided with a smooth cylindrical portion 28 which terminates at its outer end in a conical transition portion 29 with an end portion 31 provided with suitable flats or the like to receive a wrench or removable valve handle to allow rotation of the valve member 23. The smooth portion 28 of the valve stem 26 extends within an end portion 32 of the valve body which may be provided with external threads as indicated at 33 to receive a removable protective cap (not shown) adapted to extend over and cover the end portion 31 of valve stem 26.

Figure 2:
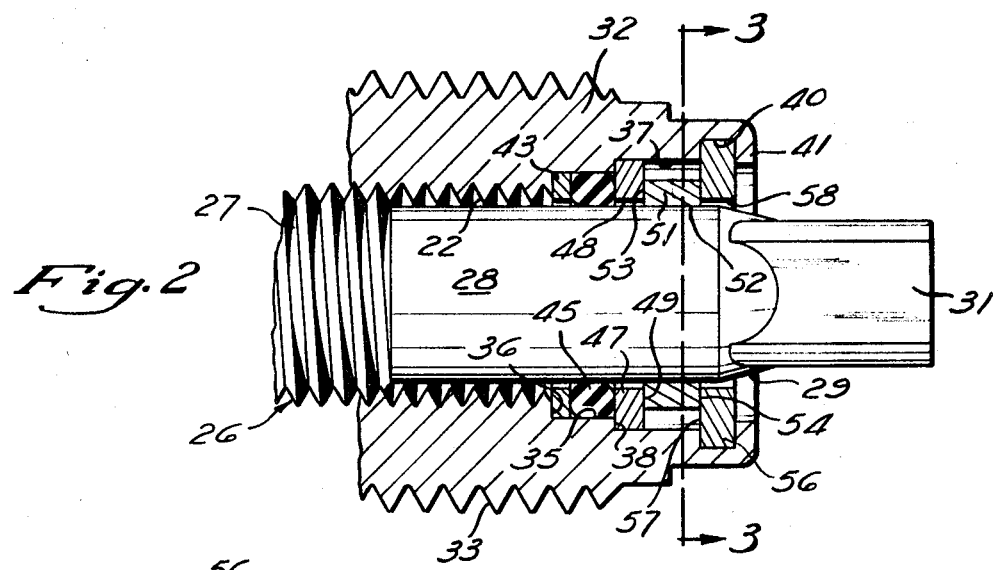
FIG. 2 is an enlarged fragmentary cross-sectional view of the friction braking and locking arrangement shown in FIG. 1.

Further details of the friction braking arrangement of this invention are shown in the enlargement of FIG. 2 wherein the end portion 32 of valve body 10 is provided, outwardly of the threaded passage 22 with a first counterbore 35 terminating at its axially inner end in a radial shoulder 36. At its outer end, the counterbore 35 terminates in a radial shoulder 38 joining a larger outer counterbore 37. At its outer end, the counterbore 37 is provided with a radially recessed annular groove 40 which terminates at its outer end in an end flange 41 extending radially inward from the axially extending surface of the annular groove 40. It will be understood that the flange 41 may be formed by spinning or crimping so that as the valve body 10 is originally formed, the annular groove 40 is in the form of a counterbore extending outwardly to the outer end of the end portion 32 and the flange 41 is then formed by radially deforming the axially outermost portion of the end 32 to form the outer side of the annular groove 40.

The friction braking or locking structure of this invention is located within the end portion 32 of valve body 10 and includes a backing washer 43, generally rectangular in cross section and substantially rigid, which seats against the inner shoulder 36 of the first counterbore 35 to make a tight sealing fits with the valve body 10 while having a substantial clearance from the smooth portion 28 of valve stem 26. An O-ring 45 is located within the first counterbore 35 outwardly of the backing washer 43 and is arranged to make a sealing fit against both the counterbore 35 and the smooth portion 28 of valve stem 26. To retain the O-ring 45 in position, an inner friction washer 47 is mounted within the outer counterbore 37 in abutting engagement with the shoulder 38. The friction washer 47 is likewise arranged to have a tight fit with both the shoulder 38 and the counterbore 37 and is provided with an axially extending radial inner surface 48 providing a clearance with the valve stem smooth portion 28 to avoid any sliding contact therebetween while providing sufficient backing support for the O-ring 45 to prevent leakage from the interior of the valve.

The friction washer 47 has a radially extending axially outer face 49 which abuts against a radially extending axially inner face 53 of a friction sleeve 51 carried on the smooth portion 28 of valve stem 26. The sleeve 51 has an axially extending radially inner surface 52 in frictional contact with smooth portion 28, and in addition has a radially extending axially outer end 54 which makes engagement with the radially extending axially inner face 57 of an outer friction washer 56 which is secured within the annular groove 40 by the end flange 41. This outer friction washer 56 is also provided with an axially extending radially inner surface 58 having a substantial clearance with the smooth portion 28 to avoid any interference or contact therebetween.

Since the friction sleeve 51 is made to have a frictional engagement with the smooth portion 28 of valve stem 56, it will be understood that upon rotational movement of the valve stem 26, this arrangement provides a frictional braking or locking resistance against rotational movement of the valve stem and these forces result from three substantially distinct but interrelated sources of friction. Because this arrangement provides an axial resistance to movement of the valve stem 26, there is generated a first frictional torque as a result of the axial load applied between the threaded portion 27 of valve stem 26 and the threaded passage 22. A second frictional force results from the fact that the friction sleeve 51, must, depending upon the direction of rotation of the valve stem 26, make abutting engagement with one or the other of the friction washers 47 and 56 to provide a frictional engagement with the adjacent friction washer which requires an additional torque applied to the valve stem 26 to overcome this resistance.

A third source of friction in this arrangement results from the fit between the friction sleeve 51 and the smooth portion 28 of valve stem 26. According to the preferred embodiment of this invention, the friction sleeve 51 is made from a circumferentially continuous unitary piece of material having high elongation characteristics. The sleeve is originally made to provide a considerable interference fit with the smooth portion 28 so that when the friction sleeve 51 is assembled by a pressing operation past the conical portion 29 onto the smooth portion 28 of valve stem 26, the material of the sleeve 51 is deformed beyond its yield point to result in a plastic deformation of the sleeve providing an elastic fit against the smooth portion 28 determined by the strength characteristics of the material of the sleeve. It will be understood that since the sleeve is deformed plastically, the original tolerances have little effect upon the resulting interference fit which is determined in such case principally by the properties of the material of the sleeve rather than by its original dimensions.

Since the friction sleeve 51 is plastically deformed, it provides an interference fit on the smooth portion 28 which provides the third frictional resistance or braking torque resulting from the forces required to axially displace the sleeve 51 on the smooth portion 28. These forces, while interrelated with frictional forces between the end surfaces of the sleeve 51 and the friction washers 47 and 56, still is a separate source of a frictional braking or locking force on the valve stem 26.

The three separate frictional braking or locking torques are provided by the threads, the axial faces of the friction sleeve and friction washers and the fictional fit between the sleeve and the valve stem, and since these forces, assuming that the friction sleeve 51 has been plastically deformed, are substantially independent of the dimensions of the respective parts, a considerable dimensional tolerance can be allowed while retaining substantially identical performance characteristics determined principally by the physical properties of the materials used rather than by the physical dimensions of the parts. However, the frictional forces produced by the axial loading of the threads and between the sleeve and the friction washer depend upon the axial force required to move the sleeve along the valve stem and this fit tends to determine the principal frictional forces restraining the valve stem.

Figure 3:
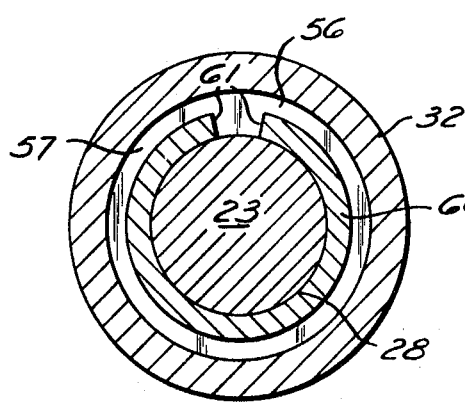
FIG. 3 is a cross-sectional view taken on line 3—3 of FIG. 2 showing another embodiment of this invention.

Depending upon the choice of material for the friction sleeve 51, the frictional torque or axial force required to axially displace the sleeve along the valve stem may be the greatest frictional force in terms of magnitude, but it is recognized that under some circumstances it may be desired that the frictional braking or locking torque be substantially reduced to a level below that which can be obtained by the interference fit between the sleeve 51 and the valve stem smooth portion 28. In such case, the friction sleeve may be split as shown in FIG. 3 so that the radial deformation of the sleeve is elastic rather than plastic and results from the bending action in spreading or radially expanding the sleeve as provided by the slot indicated at 61 on the friction sleeve 60. However, since the sleeve 60 is constructed substantially the same as the sleeve 51 apart from the slot 61 and the fact that the sleeve is elastically rather than plastically deformed, this device operates in substantially the same way as that shown in FIGS. 1 and 2 except for the substantial reduction in the axial force required to displace the friction sleeve along the valve stem.

While in the preferred embodiment of this invention, the friction washers 47 and 56 and the friction sleeve 51 are made of metallic materials to provide high temperature resistance, it is understood that one or more of these parts may be made from a plastic or synthetic organic material depending upon the frictional properties desired and that various arrangements regarding the fit between the sleeve 51 and the smooth portion 28 may be used depending upon the desired total resulting friction force applied to the valve stem.

In the embodiments shown in FIGS. 1 through 3 and described hereinabove, the friction sleeve 51 has been interposed between the friction washers 47 and 56 by an assembly operation which may required or allow a certain amount of axial clearance between the sleeve and the friction washers. Such clearance is of little importance when the value is normally used in either the fully closed or fully opened position, as is the usual practice for such refrigeration valves as shown in the figures, and therefore the frictional braking or locking restraint provides the desired results under the circumstances even though there may be a very small amount of limited axial play for the valve stem before the full amount of the frictional braking or locking forces are brought into full effect.

In the arrangement shown in FIGS. 1 through 3, a certain amount of axial free play between the friction sleeve 51 and either of the washers 47 and 56 may occur depending not only upon the tolerances of these parts, but upon the tolerances with which they are assembled in the valve body 10. In certain applications, it may be that any amount of free play resulting from assembly tolerances is undesirable, and therefore it is desired to have a frictional braking and locking arrangement which eliminates any free play in the axial or rotary direction between the valve stem and the valve body. An arrangement that accomplishes these results is shown in FIGS. 4 and 5. In this arrangement, the valve body 10 is constructed identically with the valve body shown in FIGS. 1 through 3, to include the same counterbores 35 and 37 and shoulders 36 and 38 as described in greater detail in connection with FIG. 2. Likewise, the sealing and frictional braking and locking arrangement is provided with a backing washer 43 and an O-ring 45 which is confined by an inner friction washer 47 in the same manner as described hereinabove in connection with FIG. 2. Likewise, the assembly includes an outer friction washer 56 confined in annular groove 40 by flange 41 so that all of the parts listed hereinabove are the same in construction and function as those in the embodiments shown in FIGS. 1 through 3.

In the embodiment of FIGS. 4 and 5, the difference lies in the construction of the friction sleeve 63 which replaces the friction sleeve 51 in the embodiments of FIGS. 1 through 3. The friction sleeve 63 may be either circumferentially continuous so that it is assembled with a fit requiring plastic deformation of the material, or it may be longitudinally split as shown in the embodiment of FIG. 3, and these distinctions effect only the amount of frictional force as a result of axial movement between the sleeve 63 and the valve stem smooth portion 28.

According to this embodiment of the invention, the frictional sleeve 63 is provided with an axially extending radially inner surface 64 adapted to make frictional engagement with the smooth portion 28 of the valve stem 26 and at its inner end is provided with a radially extending axially inner surface 65 adapted to make frictional contact with the inner frictional washer 47. At its other axial end, the friction sleeve 63 is formed with a radially extending end face 67 which terminates in an axially extending lip 69 having an inner side 70 and an outer side 71, the latter of which may be in the undeformed state continuous with the outer surface of the sleeve 63.

With this arrangement, the friction sleeve 63 including the lip 69 has an axial extend greater than the space in between the washers 47 and 56 so that upon the assembly of the outer friction washer 56 as shown in FIG. 4, the washer 56 will initially contact the axially outer end of the lip 69 before it comes into abutting engagement with the inner side of the annular groove 40. If sufficient axial force is applied to the friction washer 56 and the end flange 41 subsequently spun radially inward, the lip 69 is forced into a plastic deformation into the outwardly extended arrangement as shown at 73, FIG. 5, so that while the lip 69 has been plastically deformed, the inner face 57 of friction washer 56 is still spaced away from the end face 65 of the friction sleeve 63 so that the frictional engagement is between the outwardly deflected inner side 70 of lip 69 and the inner face 57 of friction washer 56. Assuming that the lip 69 has been plastically deformed, the axial force applied between the friction washers 47 and 56 is therefore a substantial constant regardless of the actual amount of physical displacement of lip 69 beyond its elastic limit.

With this arrangement, because of the deformation of the lip 69, there is no longer any axial play between the friction sleeve 63 and either of the friction washers 47 and 56 so that although the device shown in FIGS. 4 and 5 operates in substantially the same way to produce the same results as the embodiments of FIGS. 1 through 3, any possibility of axial play between the friction sleeve and the friction washers has been substantially eliminated by the plastic deformation of the lip 69 so that the frictional forces not only between the threads but between the sleeve and the friction washers as well as between the friction sleeve and the valve stem are applicable at all times regardless of the amount of incremental angular movements of the valve stem 26. Thus, substantially constant frictional braking and locking characteristics are shown by this device not only throughout its entire range of movement but also for small increments which may be utilized when the valve is used for throttling purposes in which the clearance between the valve seat 15 and valve member head 24 must be closely controlled.

As previously described, the interference fit between the frictional sleeve and the valve stem provides parts characteristics substantially independent of the physical dimensions of these torques because during assembly the friction sleeve is expanded radially beyond its elastic limit. It will be noted that the O-ring 45 is provided to provide a suitable seal at this point and the operation of the friction sleeve is of a further value is connection with the O-ring seal 45. Under normal arrangement where the valve stem may be moved axially over a considerable range of movement, damage to the O-ring 45 may occur because of the surface roughness of the smooth portion 28. Because the friction sleeve makes a sliding engagement with this surface, it tends to have a burnishing or polishing action upon the smooth portion 28 so that repeated cycling of the valve between the full closed and full open position actually results in an improvement of the surface finish on the outer cylindrical portion of the valve member 26. As a result of the frictional engagement with the inner surface of the friction sleeve 51 and as a result of this polishing action, the possible damage to the O-ring 45 is greatly decreased giving extended life to the valve assembly without danger of leakage.

While the invention in its preferred embodiments has been shown in connection with providing a locking and braking arrangement on a valve stem, it will be understood that this arrangement can be used under other circumstances to provide a carefully selected frictional engagement between a shaft and a shaft supporting member whether the movement be longitudinal, rotary or any combination of these movements and in general it may be adapted to provide a friction braking and locking arrangement between any shaft and a supporting member regardless of the cross-sectional shape of either.

We claim:

1 A frictional braking and locking arrangement for a shaft supportedly guided in a housing wherein said shaft has a smooth peripheral portion in said housing, a friction sleeve on said smooth portion of said shaft in frictional engagement therewith, the frictional force between said sleeve and said shaft substantially resulting from the residual tensile stress in the sleeve after plastic radially outward deformation of the sleeve in a manner such that the frictional force is determined by the tensile yield point of the material of said sleeve and is substantially independent of the amount of plastic radial deformation, friction abutment means carried in said housing and engageable with the ends of said sleeve, said friction abutment means including two friction abutment rings, one ring at each axial end of said sleeve and mounted in said housing against axial movement whereby helical movement of said valve stem in one direction or the other causes one or the other of said friction rings to engage said friction sleeve, said sleeve having a first radial end surface engaging one of said friction abutment rings and said sleeve having a plastically deformable lip portion of lesser radial thickness than the remainder of said sleeve in frictional engagement with the other of said friction abutment rings, whereby the frictional forces required to move said shaft axially and rotatably with respect to said housing are determined by the frictional engagement between said sleeve and said abutment means and said sleeve and said shaft.

2. A frictional braking and locking structure for a valve having a housing and a valve stem shaft supportedly guided in said housing for helical movement therein, comprising a smooth cylindrical portion of said shaft, a friction sleeve in said housing carried on said smooth portion and in frictional engagement therewith, friction abutment means axially fixed with respect to said housing at each axial end of said sleeve including radially extending abutment surfaces each facing the other and separated by a predetermined spacing, said friction sleeve having a first portion of generally tubular cylindrical shape defining the major part of the axial length of the friction sleeve, said first portion having a first surface of a diameter equal to the diameter of said smooth cylindrical portion and a second outer surface of a second diameter, said friction sleeve having at one end of said first portion a face extending radially from said inner surface to said outer surface and in abutting engagement with one of said abutment surfaces, said friction sleeve having adjacent its other end an end face extending radially outward from said inner surface to an inner side of a lip portion of the friction sleeve, said lip portion extending axially and radially outward from said end face and having a cross-sectional area and therefore a compressive strength less than the first portion, said lip portion being plastically deformed in an axial direction by the other of said abutment surfaces and being in tight abutting engagement with such other abutting surface, the plastic deformation of the lip portion resulting in a sleeve length equal to the predetermined axial spacing between said abutment surfaces and thereby preventing movement of said sleeve in said housing due to axial reciprocation of said shaft.

3. A frictional braking and locking structure as set forth in claim 2 wherein said sleeve is circumferentially continuous and plastically deformed beyond its elastic limit to provide a frictional gripping between said sleeve and said smooth cylindrical portion substantially independent of the amount of plastic deformation of said sleeve.

4. A frictional braking and locking structure as set forth in claim 2 wherein said friction sleeve is a longitudinally split ring elastically gripping said smooth portion of said valve stem.

PO-1050
(5/69)

UNITED STATES PATENT OFFICE
CERTIFICATE OF CORRECTION

Patent No.  3,602,340     Dated  August 31, 1971

Inventor(s)   Tadeusz Budzich & Frederick S. Browne

It is certified that error appears in the above-identified patent and that said Letters Patent are hereby corrected as shown below:

Column 6, line 35, change "parts" to --torque--

Column 6, line 37, change "torques" to --parts--
             second occurrence

Column 6, line 40 change "is"/to --in--

Column 7, line 21, change "of" to --on--

Signed and sealed this 14th day of March 1972.

(SEAL)
Attest:

EDWARD M. FLETCHER, JR.    ROBERT GOTTSCHALK
Attesting Officer        Commissioner of Patents